US012664786B2

(12) United States Patent
Okuda

(10) Patent No.: US 12,664,786 B2
(45) Date of Patent: Jun. 23, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takeru Okuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/924,268

(22) Filed: Oct. 23, 2024

(65) Prior Publication Data

US 2025/0139976 A1 May 1, 2025

(30) Foreign Application Priority Data

Oct. 31, 2023 (JP) ................................. 2023-187261

(51) Int. Cl.
*G06V 20/52* (2022.01)
*G06T 7/20* (2017.01)
*G06V 40/20* (2022.01)

(52) U.S. Cl.
CPC ................ *G06V 20/52* (2022.01); *G06T 7/20* (2013.01); *G06V 40/20* (2022.01); *G06V 2201/07* (2022.01)

(58) Field of Classification Search
CPC ........ G06V 20/52; G06V 20/53; G06V 10/62;

G06V 40/20; G06V 40/23; G06V 40/25; G06T 7/292; G06T 2207/30232; H04N 7/18; H04N 7/181; H04N 7/183; H04N 23/695
See application file for complete search history.

(56) References Cited

U.S. PATENT DOCUMENTS

| | | | | |
|---|---|---|---|---|
| 2010/0194566 A1* | 8/2010 | Monden | .................... | G07C 9/00 |
| | | | | 340/568.1 |
| 2019/0081968 A1* | 3/2019 | Wang | ..................... | H04L 63/102 |
| 2019/0236738 A1* | 8/2019 | Lebel | ..................... | G06F 18/214 |
| 2019/0354777 A1* | 11/2019 | Beck | ....................... | G06V 20/52 |
| 2021/0286978 A1* | 9/2021 | Kamio | .................. | G06V 40/166 |
| 2022/0076001 A1* | 3/2022 | Onozato | ................ | G06V 20/53 |
| 2023/0410115 A1* | 12/2023 | Naito | ..................... | G07G 3/006 |

FOREIGN PATENT DOCUMENTS

JP      2018195992 A    12/2018

* cited by examiner

*Primary Examiner* — John W Miller
*Assistant Examiner* — Humam M Satti
(74) *Attorney, Agent, or Firm* — Canon U.S.A., Inc. IP Division

(57) ABSTRACT

An image processing apparatus includes at least one memory storing instructions and at least one processor that executes the stored instructions to cause the at least one processor to acquire a captured image and identify at least one fraudulent person involved in a fraudulent act from among a plurality of persons in the captured image based on at least one of a combination of behaviors of the plurality of persons and a combination of positions of the plurality of persons.

14 Claims, 12 Drawing Sheets

FIG. 5

| ID 501 | ACT 502 | PROBABILITY OF PERFORMING THE ACT 503 | CLASSIFICATION OF ACT 504 | POSITION OF PERSON 505 | ROLE 506 | FRAUDULENT PERSON DETERMINATION 507 |
|---|---|---|---|---|---|---|
| 001 | SHOPLIFTING | 90% | FRAUDULENT ACT | IN FRONT OF COMMODITY SHELF | PERPETRATOR | ○ |
| 002 | LOOKOUT | 80% | QUASI-FRAUDULENT ACT | WITHIN RADIUS 10 m FROM ID 001 | LOOKOUT | ○ |
| 003 | WALKING | 95% | GENERAL ACT | AISLE | GENERAL PERSON | × |
| 004 | PICKING UP PRODUCT | 70% | GENERAL ACT | IN FRONT OF COMMODITY SHELF | GENERAL PERSON | × |
| 005 | TALKING TO SECURITY GUARD | 65% | QUASI-FRAUDULENT ACT | WITHIN RADIUS OF 1 m FROM SECURITY GUARD | DECOY | ○ |

IMAGE PROCESSING APPARATUS, IMAGE PROCESSING METHOD, AND STORAGE MEDIUM

BACKGROUND

Field

The present disclosure relates to a method for identifying a person who is involved in a fraudulent act.

Description of the Related Art

Fraudulent acts, such as impersonations in face authentication, shoplifting in stores, and jumping over flapper gates, can involve collaborators who act as lookouts in addition to the perpetrators of the fraudulent acts. Japanese Patent Application Laid-Open No. 2018-195992 discusses a technique for identifying a perpetrator of a fraudulent act (principal offender) and an accomplice based on tracking information about persons acquired from images captured by monitoring cameras.

SUMMARY

According to an aspect of the present disclosure, an image processing apparatus includes at least one memory storing instructions and at least one processor that executes the stored instructions, which cause the at least one processor to acquire a captured image, and identify at least one fraudulent person involved in a fraudulent act from among a plurality of persons in the captured image based on at least one of a combination of behaviors of the plurality of who of positions of the plurality of persons.

Further features of the present disclosure will become apparent from the following description of exemplary embodiments with reference to the attached drawings.

BRIEF DESCRIPTION OF THE DRAWINGS

FIG. 5 illustrates examples of information managed by a person information management unit according to the first exemplary embodiment.

DESCRIPTION OF THE EMBODIMENTS

Exemplary embodiments of the present disclosure will be described in detail with reference to the attached drawings. Configurations described according to the following exemplary embodiments are merely examples, and the present disclosure is not limited to the illustrated configurations.

According to a first exemplary embodiment, a method will be described for identifying a fraudulent person based on a combination of behaviors and/or positions of a plurality of persons in an image captured by a monitoring camera. According to the present exemplary embodiment, a fraudulent person is a person who is determined to have committed a fraudulent act or to be suspected of committing a fraudulent act. A fraudulent act according to the present exemplary embodiment can be classified into an act that is regarded as a fraudulent act by one person (for example, impersonation or shoplifting) and an act that aids and abets the fraudulent act (for example, hiding a fraudulent perpetrator or watching the surrounding area thereof). According to the present exemplary embodiment, an act that is regarded as a fraudulent act by one person is referred to as a "fraudulent act" and an act that aids and abets a fraudulent act is referred to as a "quasi-fraudulent act" to distinguish these two acts. According to the present exemplary embodiment, a person who commits a fraudulent act is referred to as a fraudulent perpetrator, a person who commits a quasi-fraudulent act is referred to as a fraudulent collaborator, and a fraudulent person is described as a combined concept of a fraudulent perpetrator and a fraudulent collaborator.

According to the present exemplary embodiment, a scene in which a perpetrator of shoplifting and a lookout are identified in a supermarket where a monitoring camera is installed is described as an example. Specifically, an example in which a fraudulent act is shoplifting and a quasi-fraudulent act is watching the surroundings is described.

<Hardware Configuration of Image Processing Apparatus>

Figure 1:
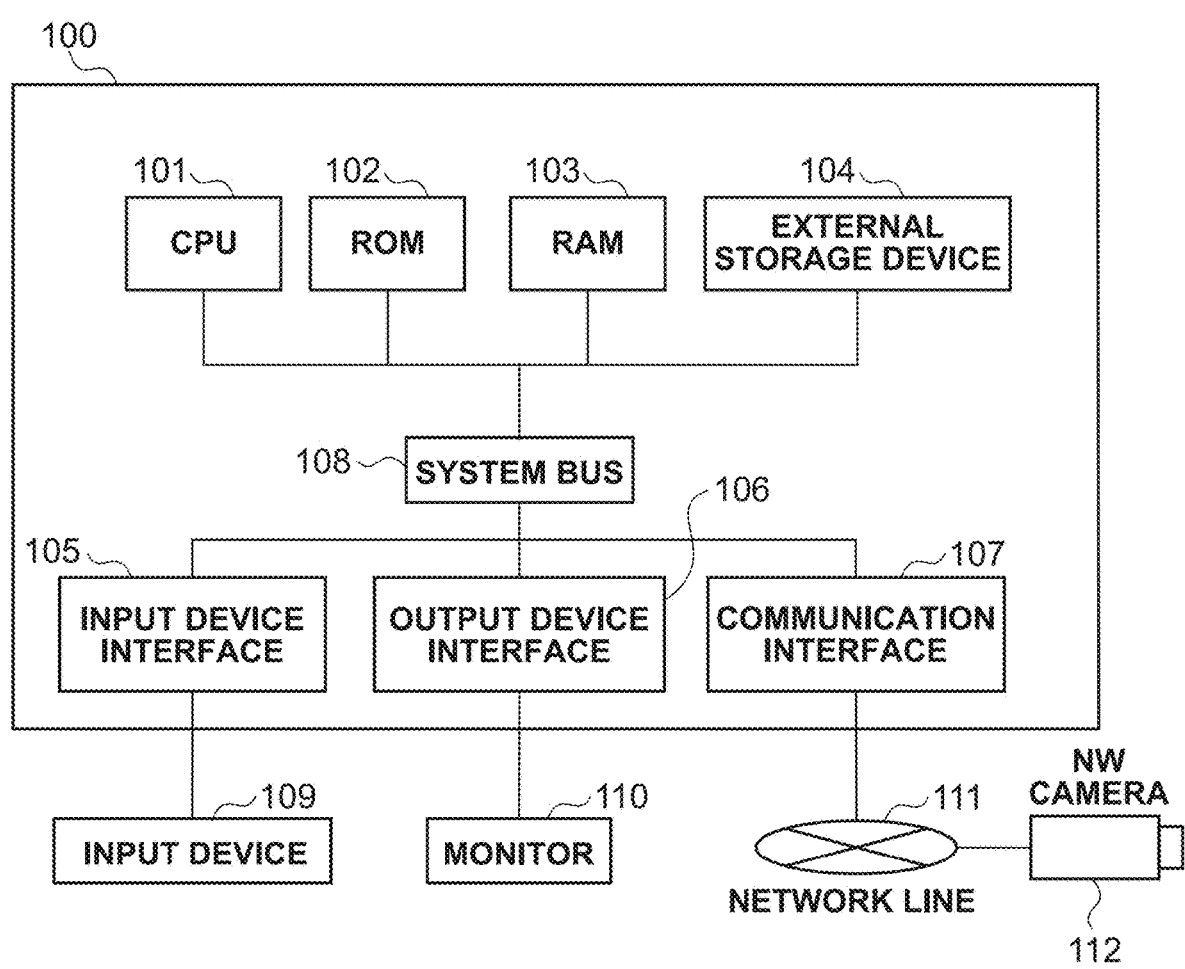
FIG. 1 illustrates an example of the hardware configuration of an image processing apparatus according to a first exemplary embodiment.

A hardware configuration of an image processing apparatus according to the present exemplary embodiment will be described with reference to a block diagram in FIG. 1. As illustrated in FIG. 1, an image processing apparatus 100 according to the present exemplary embodiment includes a central processing unit (CPU) 101, a read-only memory (ROM) 102, a random access memory (RAM) 103, an external storage device 104, an input device interface 105, an output device interface 106, and a communication interface 107.

The CPU 101 generally controls the image processing apparatus 100. The ROM 102 stores programs and parameters that do not require modification. The RAM 103 temporarily stores programs and data supplied from an external device. The external storage device 104 is a hard disk, a memory card, or another type of memory installed in the image processing apparatus 100. The external storage device 104 can include an optical disk, a magnetic card, an optical card, an integrated circuit (IC) card, and a memory card, which are each a flexible disk (FD) or a compact disk (CD), that can be attached to and detached from the image processing apparatus 100.

The input device interface 105 is an interface between the image processing apparatus 100 and an input device 109 used for user operations, such as a pointing device or a keyboard. The output device interface 106 is an interface between the image processing apparatus 100 and a monitor 110 that displays data stored in the image processing apparatus 100 and data supplied from the outside. The communication interface 107 connects the image processing apparatus 100 to a network line 111, such as the Internet. The image processing apparatus 100 is connected to a network (NW) camera 112 via the network line 111.

The NW camera 112 (image capturing apparatus) captures video. A system bus 108 is a transmission path that connects each of the above-described units 101 to 107 so that they can communicate with each other.

Each processing described below with reference to flowcharts illustrated in FIGS. 3, 4, 7, 8, and 10 is carried out by the CPU 101 executing programs stored in a computer-readable storage medium, such as the ROM 102. At least one of the input device 109, the monitor 110, and the NW camera 112 can be integrated into the image processing apparatus 100.

<Function of Image Processing Apparatus>

Figure 2:
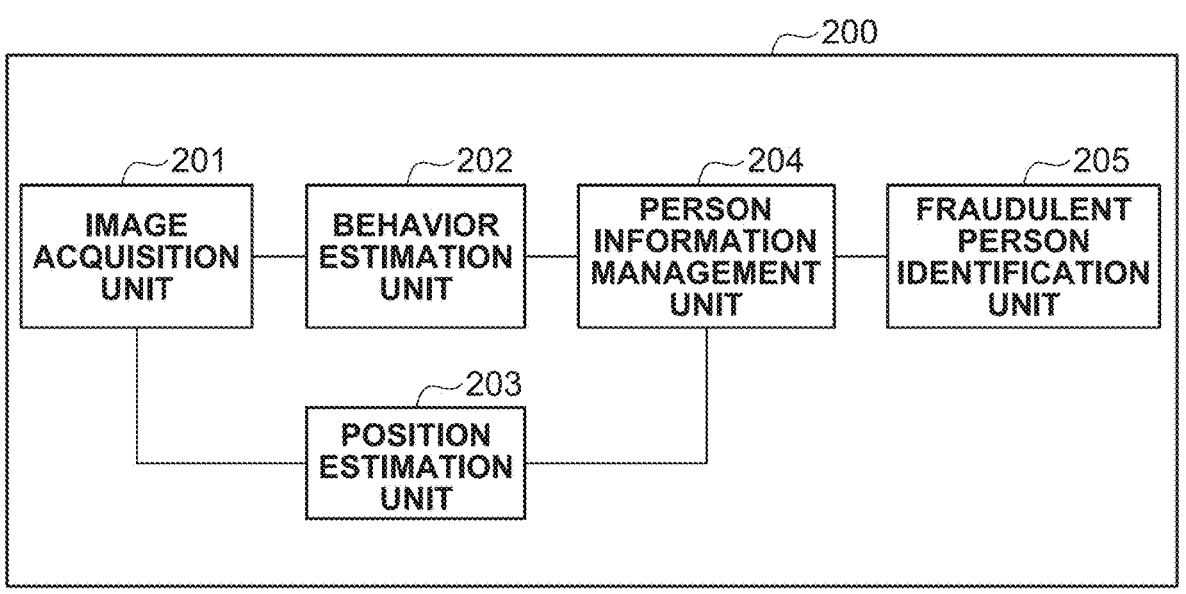
FIG. 2 is a block diagram illustrating functions of the image processing apparatus according to the first exemplary embodiment.

Functions of the image processing apparatus according to the present exemplary embodiment will be described with reference to a block diagram in FIG. 2. As illustrated in FIG. 2, an image processing apparatus 200 according to the present exemplary embodiment includes an image acquisition unit 201, a behavior estimation unit 202, a position estimation unit 203, a person information management unit 204, and a fraudulent person identification unit 205. The hardware configuration of the image processing apparatus 200 is as illustrated in FIG. 1.

The image acquisition unit 201 acquires the monitor image (captured image) that is acquired by a monitoring camera (the NW camera 112 in FIG. 1) capturing an image of a monitoring target area. The image acquisition unit 201 according to the present exemplary embodiment assigns an identification (ID) for identifying an individual to each of a plurality of persons in the monitor image. Known techniques, such as face authentication or gait authentication, can be used for identifying an individual. A monitor image acquired by the image acquisition unit 201 can be a single image or a moving image including a plurality of images.

The image acquisition unit 201 which plays a role of acquiring moving images can assign the same ID to the same person detected in each image and perform tracking processing. One or a plurality of monitoring cameras can be used. With a plurality of monitoring cameras used, the image acquisition unit 201 can perform tracking processing by associating images of the same person captured by the different cameras with each other.

The behavior estimation unit 202 estimates the behavior of each of the plurality of persons in the monitor image acquired by the image acquisition unit 201. Skeleton information, which is information connecting joint points of a human body, can be used to estimate the behavior. A procedure in which the behavior estimation unit 202 estimates a person's behavior using time-series skeleton information extracted from moving images will now be described.

First, the behavior estimation unit 202 collects moving images displaying a specific behavior and time-series skeleton information for the moving images. For example, in shoplifting, the skeleton information makes a transition in the order of reaching out a hand, grabbing an object, and bending an arm. With a lookout, the skeleton information about the upper body makes a transition in left and right. Then, the behavior estimation unit 202 performs skeleton estimation on a person A detected on monitor images to extract time-series skeleton information. If time-series skeleton information about the person A is similar to the time-series skeleton information indicating a specific behavior, the behavior estimation unit 202 determines that the person A performs the specific behavior. In this way, the image processing apparatus 200 estimates the behavior of each of the plurality of persons in the monitor images.

As another method for a behavior estimation, the behavior of a person in monitor images can be estimated using a deep learning model that is trained in advance using moving images displaying specific behaviors as learning data. In addition, the likelihood of a behavior can be determined in stages by calculating the degree of similarity with data indicating the reference behavior. Thus, the behavior estimation executed by the image processing apparatus 200 is not limited to a specific method. A behavior estimation result of each person by the behavior estimation unit 202 is managed by the person information management unit 204.

The position estimation unit 203 estimates the position of each of the plurality of persons in the monitor images acquired by the image acquisition unit 201. The position to be estimated by the position estimation unit 203 can be an absolute position in an image or a relative position with respect to a specific object or another person in the image. The position estimation unit 203 can also acquire information indicating a transition in a person's position between frames of a moving image as an estimation result of the person's position. The position estimation result of each person by the position estimation unit 203 is managed by the person information management unit 204.

The person information management unit 204 manages the behavior estimation result by the behavior estimation unit 202 and the position estimation result by the position estimation unit 203 for each of the plurality of persons in the monitor images acquired by the image acquisition unit 201. A specific example of information managed by the person information management unit 204 will be described with reference to FIG. 5.

As illustrated in FIG. 5, the person information management unit 204 according to the present exemplary embodiment associates an ID 501 of a person, an action 502, a probability 503 of performing the action, a classification 504 of the action, a position 505 of the person, a role 506, and a fraudulent person determination result 507 with each other and stores them in memory.

As described above, the image acquisition unit 201 can assign the ID 501 of each person. The action 502 and the probability 503 of performing the action correspond to the behavior estimation result by the behavior estimation unit 202. The person information management unit 204 according to the present exemplary embodiment classifies the action 502 into a fraudulent act, a quasi-fraudulent act, and a general behavior, and generates the classification 504 of the action.

The position 505 of the person in FIG. 5 corresponds to the position estimation result by the position estimation unit 203, and a relative position of each person to a specific object or a specific person is indicated in the example in FIG. 5. The person information management unit 204 according to the present exemplary embodiment defines the role 506 of each person by combining the behavior estimation result acquired by the behavior estimation unit 202 and the position estimation result acquired by the position estimation unit 203. The person information management unit 204 according to the present exemplary embodiment associates the fraudulent person determination result 507 by the fraudulent person identification unit 205, which will be described below, with other pieces of information 501 to 506 and stores them in memory. The information managed by the person information management unit 204 is not limited to the examples illustrated in FIG. 5, and various modifications can be used.

The fraudulent person identification unit 205 identifies a fraudulent person based on a combination of the behaviors and/or positions of the plurality of persons managed by the person information management unit 204. For example, if the behavior estimation unit 202 determines that the person A shoplifted, the person A is determined to be a fraudulent person (fraudulent perpetrator). In addition, if the person A who is shoplifting and a person B who is acting as a lookout are present at the same time and the person B is where the person B can see the person A, the person B is determined to be a fraudulent person (fraudulent collaborator). In other words, the fraudulent person identification unit 205 can identify one or more fraudulent perpetrators and one or more fraudulent collaborators, respectively. If no shoplifter is detected, the fraudulent person identification unit 205 according to the present exemplary embodiment determines that a person who is acting as a lookout is not a fraudulent person. The identification result of a fraudulent person by the fraudulent person identification unit 205 is managed by the person information management unit 204 as illustrated in FIG. 5.

Figure 3:
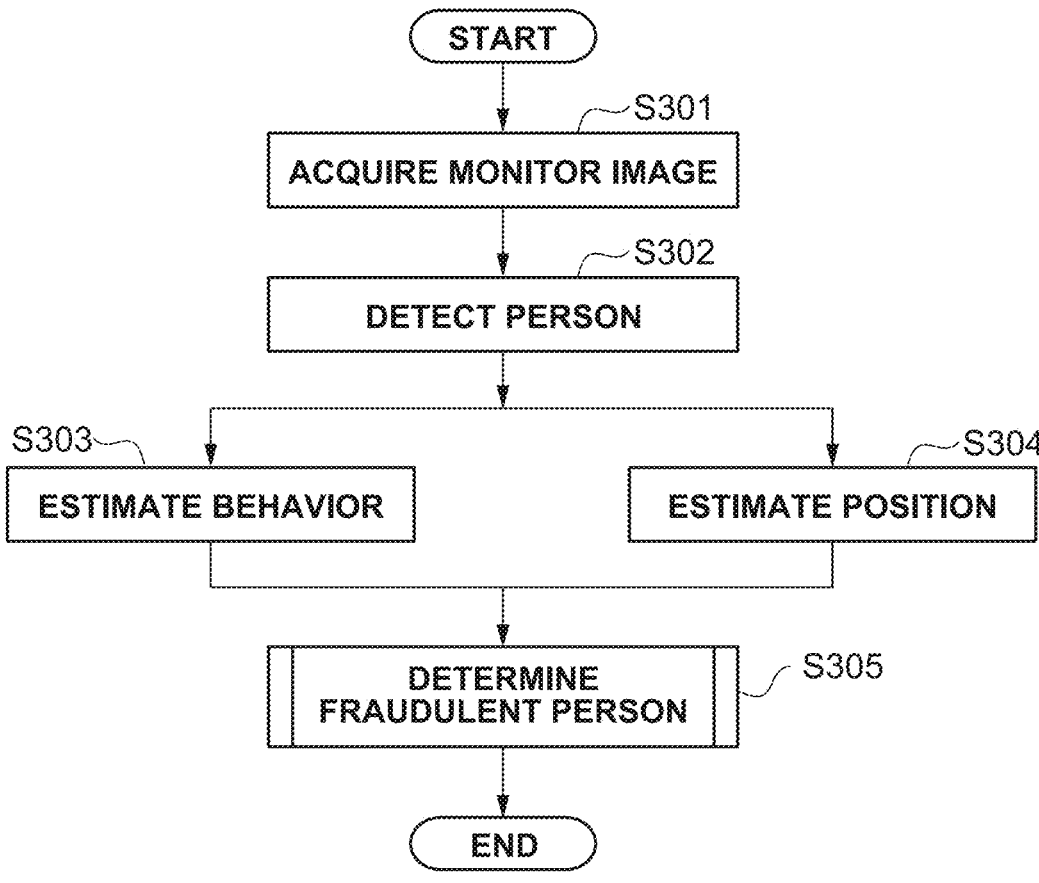
FIG. 3 is a flowchart illustrating processing executed by the image processing apparatus according to the first exemplary embodiment.

Next, an operation of the image processing apparatus 200 according to the present exemplary embodiment will now be described with reference to FIGS. 3 and 4. The processing in FIG. 3 is started, for example, in response to the issuance of an instruction to perform detection processing for a fraudulent person from a user who operates the image processing apparatus 200.

In step S301, the image acquisition unit 201 acquires a monitor image. The monitor image is acquired by the NW camera 112 capturing the image of a monitoring target area. In step S302, the image acquisition unit 201 detects a plurality of persons on the monitor image and assigns a unique ID (identification information) to each person. According to the present exemplary embodiment, the following description is given assuming that a plurality of persons is detected in step S302.

In step S303, the behavior estimation unit 202 estimates the behavior of each of the plurality of persons. The behavior estimation unit 202 according to the present exemplary embodiment estimates the person's behavior using skeleton information, which is information connecting joint points of a human body, but there are various other methods as described above.

In step S304, the position estimation unit 203 estimates the position of each of the plurality of persons. Then, in step S305, the fraudulent person identification unit 205 identifies a fraudulent person from among the plurality of persons based on a combination of the behavior estimated in step S303 and the position estimated in step S304 of each of the plurality of persons. The processing in step S305 will be described in detail with reference to FIG. 4.

Figure 4:
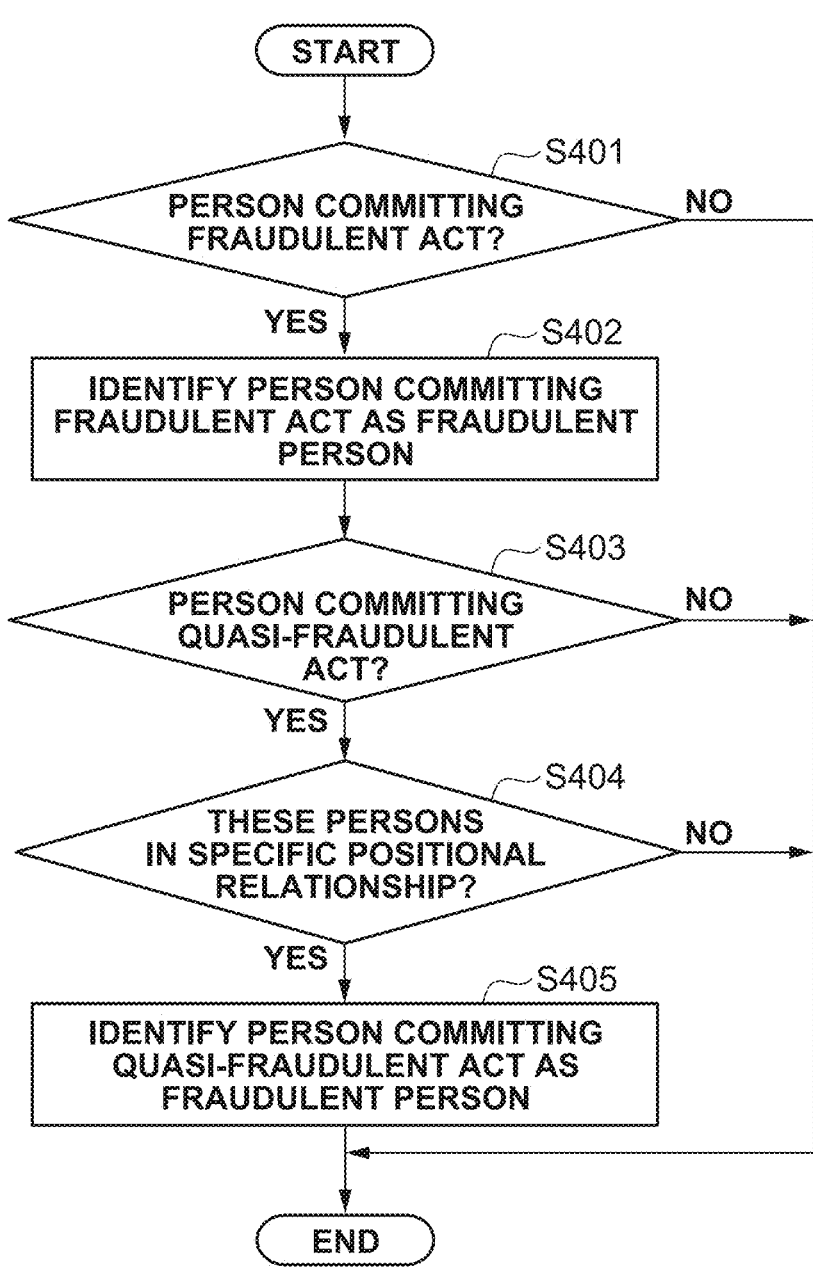
FIG. 4 is a flowchart illustrating processing executed by the image processing apparatus according to the first exemplary embodiment.

FIG. 4 is a flowchart illustrating the processing in step S305 according to the present exemplary embodiment in detail. In step S401, the fraudulent person identification unit 205 determines whether there is a person who is committing a fraudulent act among the plurality of persons detected in step S302. According to the present exemplary embodiment, the fraudulent act is described as shoplifting. In other words, the fraudulent person identification unit 205 according to the present exemplary embodiment identifies a person whose skeleton information makes a transition in the order of reaching out his/her hand, grabbing an object, and bending his/her arm as a perpetrator of shoplifting based on the time-series skeleton information about each person.

In step S401, if it is determined that there is a person who commits the fraudulent act (shoplifting) (YES in step S401), in step S402, the fraudulent person identification unit 205 identifies the person as the fraudulent person (fraudulent perpetrator) and outputs an ID (identification information) of the person to the person information management unit 204. If a plurality of persons is detected as the persons who commit the fraudulent act, the ID of each person is output to the person information management unit 204.

In step S403, the fraudulent person identification unit 205 determines whether there is a person who commits a quasi-fraudulent act among the plurality of persons detected in step S302. According to the present exemplary embodiment, the quasi-fraudulent act is described as a lookout of shoplifting. The fraudulent person identification unit 205 according to the present exemplary embodiment identifies a person whose skeleton information about the upper body makes a transition in right and left as a lookout of shoplifting based on the time-series skeleton information about each person.

In step S404, the fraudulent person identification unit 205 determines whether the person shoplifting can be seen from the person acting as the lookout. The fraudulent person identification unit 205 according to the present exemplary embodiment determines whether the person can be seen based on position information about each person estimated by the position estimation unit 203. More specifically, if the distance between the perpetrator of the fraudulent act and the perpetrator of the quasi-fraudulent act is less than a threshold value, the fraudulent person identification unit 205 can determine that the person can be seen. However, the determination is not limited to this example, and for example, whether the person can be seen can be determined based on whether an object that obstructs the visibility exists between the perpetrator of the fraudulent act and the perpetrator of the quasi-fraudulent act.

In step S405, the fraudulent person identification unit 205 identifies the person acting as the lookout as the fraudulent person (fraudulent collaborator) and outputs the ID (identification information) of the person to the person information management unit 204. In other words, the fraudulent person identification unit 205 identifies the fraudulent person (fraudulent collaborator) based on both a combination of the behaviors of the plurality of persons estimated by the behavior estimation unit 202 and a combination of the positions of the plurality of persons estimated by the position estimation unit 203. If a plurality of fraudulent collaborators is detected, the IDs of the plurality of persons are output to the person information management unit 204.

The behavior of a person acting as a lookout of shoplifting (looking around) is similar to those of ordinary customers looking for products or parents watching over their children. Thus, it is difficult to accurately identify a person acting as a lookout of shoplifting (fraudulent collaborator) based only on a behavior estimation result of each person. The fraudulent person identification unit 205 according to the present exemplary embodiment identifies a fraudulent person based on a combination of the behaviors and the positions of a plurality of persons, and thus provides an effect of identifying a fraudulent collaborator with high accuracy.

More specifically, if a person determined to be shoplifting and a person determined to be acting as a lookout are detected at the same time and the person acting as the lookout is where the person acting the lookout can see the person shoplifting, the fraudulent person identification unit 205 determines that the person acting as the lookout is a fraudulent person.

Consequently, the possibility of confusing a general shopper with a collaborator of shoplifting can be reduced.

<First Modification>

According to the above-described present exemplary embodiment, the scene is described as the example in which a perpetrator of shoplifting and a lookout are identified in a supermarket where a monitoring camera is installed. However, the fraudulent act is not limited to shoplifting and a lookout. For example, the fraudulent acts include impersonation in face authentication, tailgating at an authentication gate, vandalism to property, and jumping over a flapper gate in addition to shoplifting.

The quasi-fraudulent acts include blocking a path of a passerby, talking to an approaching person, drawing the attention of a security guard, or obstructing a monitoring camera in addition to watching the surroundings of the fraudulent perpetrator. General behaviors (non-fraudulent act) include picking up a product, walking, or operating a smartphone. According to the present exemplary embodiment, the behaviors estimated by the behavior estimation unit 202 can be classified into a fraudulent act (an act that is considered fraudulent by itself), a quasi-fraudulent act (an act that is not considered fraudulent by itself), and other general behaviors.

Types of fraudulent act and quasi-fraudulent act to be detected can be arbitrary set by a user or optimally set through learning. As described above, the fraudulent person identification unit 205 determines whether to regard a person committing a quasi-fraudulent act as a fraudulent person based on whether the person committing the quasi-fraudulent act and a person committing the fraudulent act are detected at the same time and the positional relationship of each person. As another exemplary embodiment, with a rare combination of behaviors or positions detected, the image processing apparatus 200 can determine the act as a fraudulent act.

According to the above-described exemplary embodiment, the example is described in which a perpetrator of a quasi-fraudulent act is identified as a fraudulent person based on both the behavior estimation result by the behavior estimation unit 202 and the position estimation result by the position estimation unit 203. However, a fraudulent person can be identified based on a combination of either behavior estimation results or position estimation results.

If, for example, a person committing a fraudulent act and a person committing the quasi-fraudulent act are detected at the same time, both persons cab be determined to be fraudulent persons regardless of the positional relationship between the fraudulent perpetrator and the fraudulent collaborator. If a plurality of persons is present surrounding a security guard, these persons can be determined to be fraudulent persons regardless of the behavior estimation results.

If the image processing apparatus 200 identifies a fraudulent person without using any position estimation result, the image processing apparatus 200 does not necessarily have to include the position estimation unit 203. If the image processing apparatus 200 identifies a fraudulent person without using any behavior estimation result, the image processing apparatus 200 does not necessarily have to include the behavior estimation unit 202.

As another exemplary embodiment, the image processing apparatus 200 does not need to include the behavior estimation unit 202 or the position estimation unit 203. In this case, the image processing apparatus 200 can transmit images acquired by the image acquisition unit 201 to a device different from the image processing apparatus 200 and acquire behavior estimation results and/or position estimation results as the response thereto. As yet another embodiment, the image processing apparatus 200 can receive, from another device that provides captured images, behavior estimation results and/or position estimation results of a plurality of persons in the captured images together with the captured images.

<Second Modification>

According to the above-described present exemplary embodiment, if a person committing a quasi-fraudulent act and a person committing the fraudulent act are detected at the same time, the person committing the quasi-fraudulent act is determined to be a fraudulent person. However, it is not necessary to classify a person's behavior into the fraudulent act and the quasi-fraudulent act. For example, groups of behaviors alone that correspond to fraudulent acts can be defined, enabling a fraudulent person to be identified based on information about a person who performs a behavior included in the group of behaviors.

More specifically, for example, shoplifting, purse snatching, an injurious act, a lookout, drawing the attention of a security guard, or blocking an aisle can be defined as a group of behaviors that are determined to be fraudulent acts. If a single person is detected who is suspected (but not certain) of performing an act belonging to a group of behaviors, it can be determined that there is no fraudulent person, and if a plurality of persons is detected, the plurality of persons can be determined to be fraudulent persons.

A method that can also is where the image processing apparatus 200 compares behavior data acquired from the skeleton information about a person in a monitor image with behavior data as a reference for each behavior and calculates the degree of similarity between both the pieces of behavior data. The image processing apparatus 200 sets determination criteria in two stages: "suspicious" set when the degree of similarity to behavior data about a fraudulent act exceeds a first threshold value, and "certain" set when the degree of similarity to the behavior data about the fraudulent act exceeds a second threshold value. Then, if a plurality of persons meets the criterion of "suspicious", the image processing apparatus 200 can identify the plurality of persons as the fraudulent persons.

According to the present exemplary embodiment, the example is described in which a fraudulent person is identified based on a combination of behaviors and/or positions of two persons, but a fraudulent person can be identified based on a combination of behaviors and/or positions of three or more persons. For example, if a person draws the attention of a security guard, another person blocks the path of a passerby, and yet another person acts as a lookout, it can be determined that fraudulent persons are present. A method for identifying a fraudulent person by the fraudulent person identification unit 205 is not limited to a specific method as long as the method is based on a combination of pieces of information about a plurality of persons managed by the person information management unit 204.

A second exemplary embodiment will now be described. According to the above-described first exemplary embodiment, the method has been described for identifying a fraudulent person based on a combination of behaviors and/or positions of a plurality of persons. If there are a fraudulent perpetrator and a fraudulent collaborator, it is highly likely that the two persons have made contact with each other in advance. Thus, according to the present exemplary embodiment, a configuration will be described in which persons who have made contact with each other based on a past monitor image are classified into a group, and the persons in the group are subjected to determination as to whether each of the persons is a fraudulent person, providing higher accuracy of estimating a fraudulent person.

The image processing apparatus according to the present exemplary embodiment determines two or more persons who belong to a group from among a plurality of persons based on a tracking processing result of the plurality of persons and identifies fraudulent persons based on a combination of behaviors and/or positions of the two or more persons.

Figure 6:
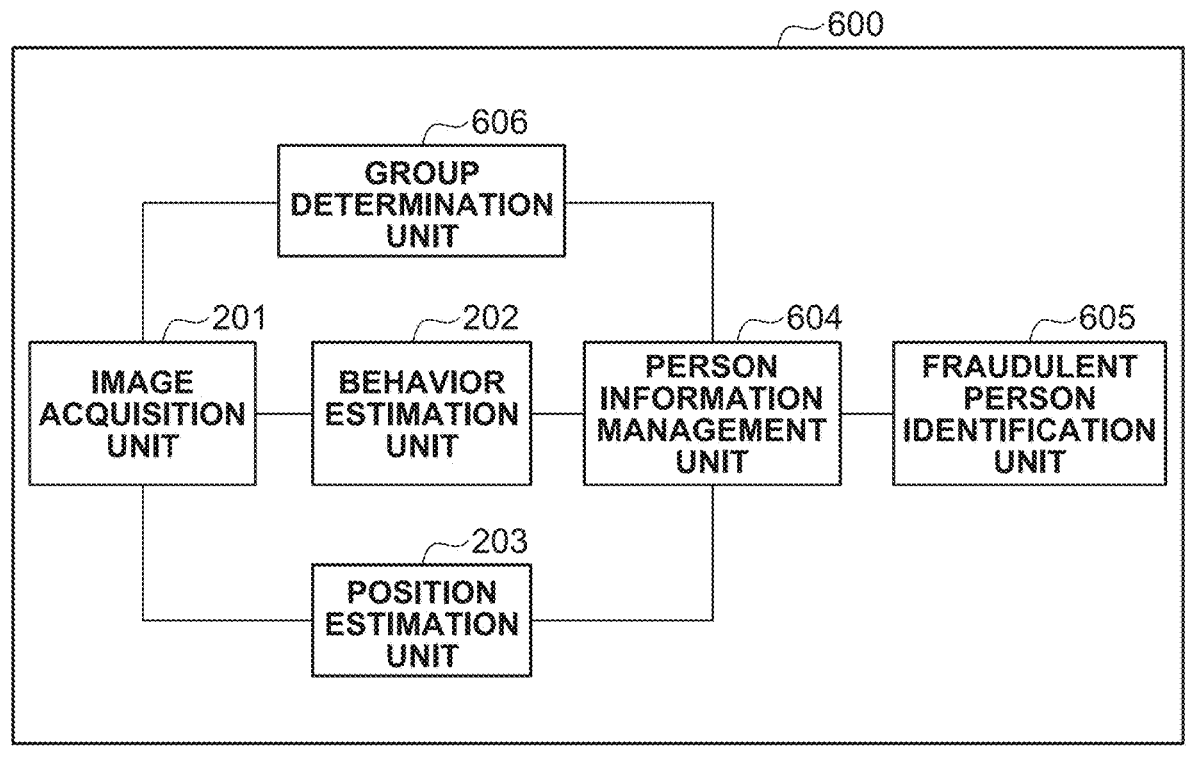
FIG. 6 is a block diagram illustrating functions of an image processing apparatus according to a second exemplary embodiment.

The configuration of an image processing apparatus 600 according to the present exemplary embodiment will be described with reference to a block diagram in FIG. 6. Like numbers refer to like blocks having functions similar to functions of the image processing apparatus 200 among the blocks included in the image processing apparatus 600, and the descriptions thereof are omitted. The image processing apparatus 600 according to the present exemplary embodiment is different from the image processing apparatus 200 in FIG. 2 in that the image processing apparatus 600 includes a person information management unit 604, a fraudulent person identification unit 605, and a group determination unit 606. The hardware configuration of the image processing apparatus 600 is as illustrated in FIG. 1.

The person information management unit 604 associates a behavior estimation result and a position estimation result of each of a plurality of persons in a monitor image acquired by the image acquisition unit 201 with group information acquired by the group determination unit 606 and stores them in memory. Information managed by the person information management unit 604 is not limited to the above-described information as long as the information is information about persons in monitor images.

The fraudulent person identification unit 605 identifies fraudulent persons based on a combination of behaviors and/or positions of the plurality of persons who are determined to belong to the same group. A combination of behavior and/or positions for determining to be a fraudulent person is similar to that according to the above-described exemplary embodiment. The identification results of fraudulent persons are managed by the person information management unit 604.

The group determination unit 606 groups the plurality of persons in a monitor image acquired by the image acquisition unit 201. The group determination unit 606 can determine a group using a known group determination technique. For example, the group determination unit 606 can perform face authentication using face information registered with a database in advance and determine a group based on results of the face authentication. In addition, a fraudulent perpetrator and the fraudulent collaborator would move along the same line of flow before committing a fraudulent act. Thus, if two or more persons in a monitor image maintain a predetermined distance or less for a predetermined period or more, the persons can be determined to belong the same group.

A fraudulent perpetrator and the fraudulent collaborator typically would communicate with each other. Thus, if a scene is detected in which two or more persons in a monitor image are talking on their smartphones at the same time, the persons can be determined to belong to the same group. A method for the group determination is not limited to a specific method as long as it can be determined whether a plurality of persons in a monitor image belong to the same group based on information managed by the person information management unit 604. The group information about a plurality of persons determined by the group determination unit 606 is managed by the person information management unit 604.

Figure 7:
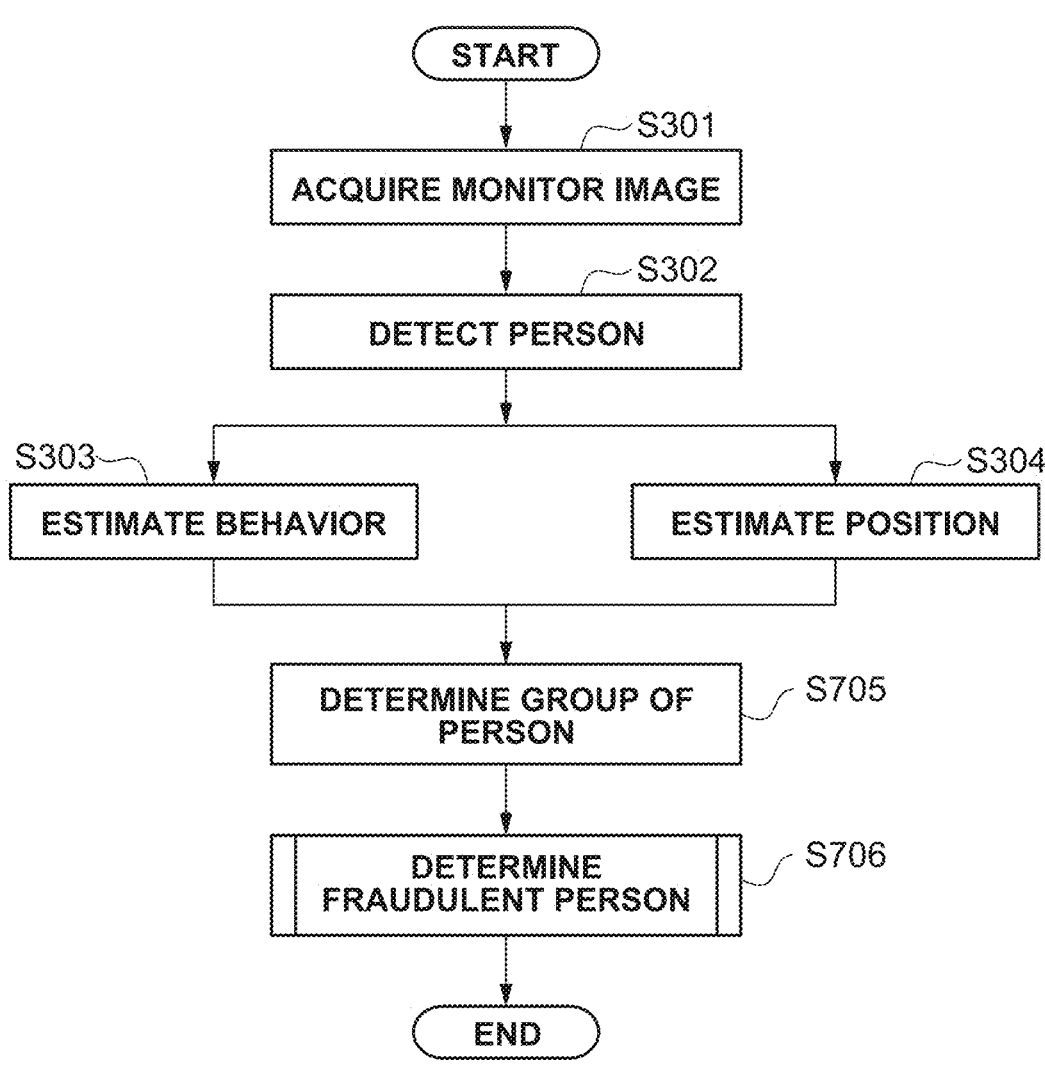
FIG. 7 is a flowchart illustrating processing executed by the image processing apparatus according to the second exemplary embodiment.

An operation of the image processing apparatus 600 according to the present exemplary embodiment will now be described with reference to FIGS. 7 and 8. FIG. 7 is different from FIG. 3 in that step S705 is added to FIG. 7, and step S305 in FIG. 3 is replaced with step S706 in FIG. 7.

In step S705, the group determination unit 606 performs group determination on a plurality of persons detected in a monitor image using the above-described method and outputs the result to the person information management unit 604.

In step S706, the fraudulent person identification unit 605 identifies a fraudulent person based on a combination of the behavior estimation result by the behavior estimation unit 202 and the position estimation result by the position estimation unit 203 for two or more persons who are determined to belong to the same group. The processing in step S706 will be described in detail with reference to FIG. 8.

Figure 8:
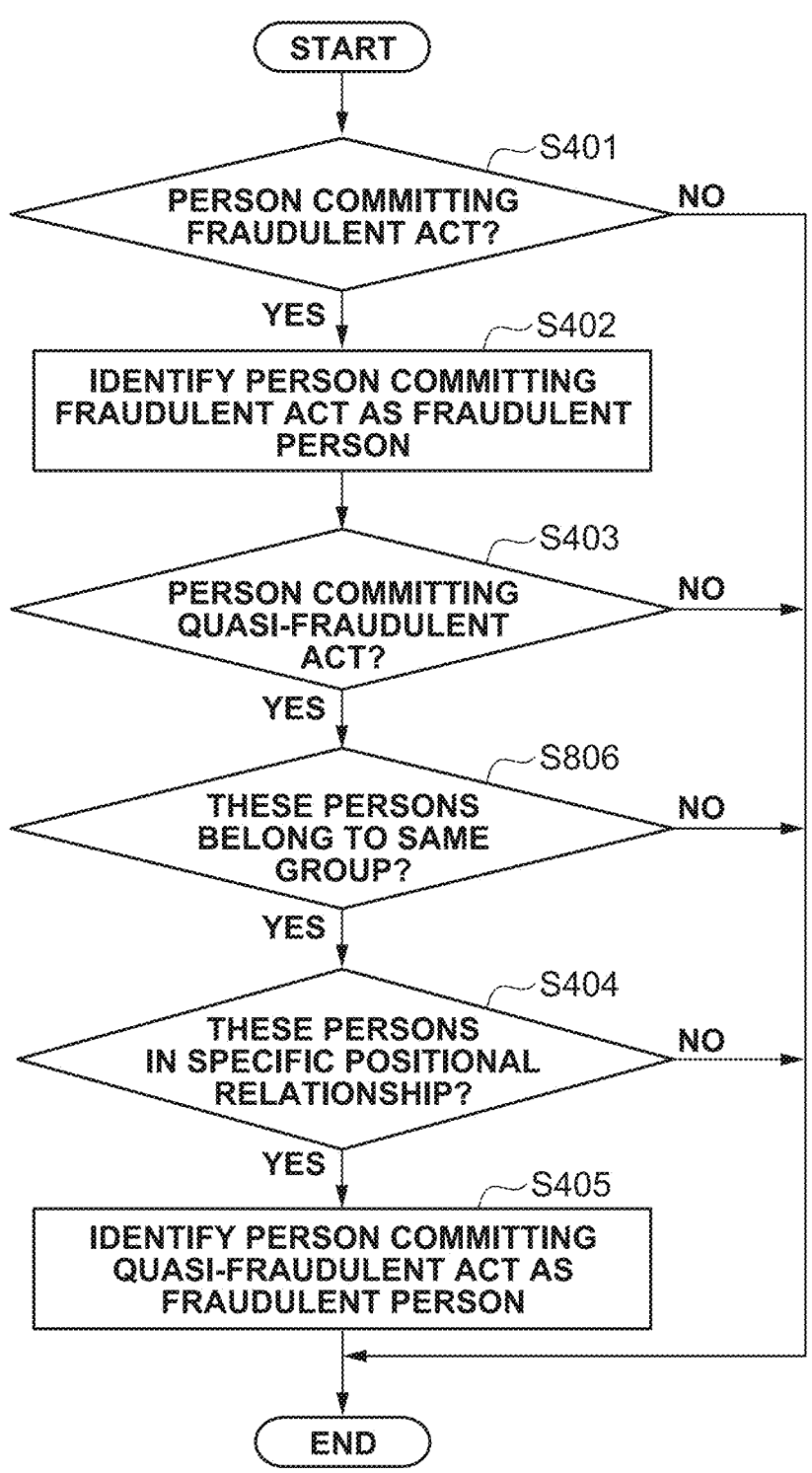
FIG. 8 is a flowchart illustrating processing executed by the image processing apparatus according to the second exemplary embodiment.

FIG. 8 is a flowchart illustrating the processing in step S706 according to the present exemplary embodiment. FIG. 8 is different from FIG. 4 in that step S806 is added to FIG. 8. In step S806, the person information management unit 604 determines whether a person determined to be committing a fraudulent act and a person determined to be committing the quasi-fraudulent act belong to the same group. If it is determined that the persons belong to the same group (YES in step S806), the processing proceeds to step S404. If it is determined that the persons belong to different groups (NO in step S806), the processing according to the flowchart in FIG. 8 is terminated.

As described above, the image processing apparatus 600 according to the present exemplary embodiment identifies a fraudulent person based on a combination of the behavior estimation result and/or the position estimation result of two or more persons determined to belong to the same group from among a plurality of persons detected in a monitor image. This configuration enables reducing the possibility that a person unrelated to a fraudulent perpetrator is erroneously determined to be a fraudulent person if that person commits the quasi-fraudulent act or a similar behavior.

A third exemplary embodiment will be now described. According to the above-described first and second exemplary embodiments, an example has been described in which a fraudulent act is detected based on a behavior estimation result, but a method for detecting a fraudulent act is not limited to a method based on a behavior estimation result. According to the present exemplary embodiment, a scene will be described as an example in which impersonation in face authentication processing is detected as a fraudulent act.

Impersonation is a fraudulent act that attempts to defeat face authentication processing using an artificial object, such as a photograph or tablet, instead of capturing an image of a real face. An image processing apparatus 900 according to the present exemplary embodiment identifies a person who performs impersonation in face authentication processing as a fraudulent perpetrator, while identifying a lookout who checks the surroundings of the fraudulent perpetrator as a fraudulent collaborator.

A configuration of the image processing apparatus 900 according to the present exemplary embodiment will be described with reference to a block diagram in FIG. 9. Like numbers refer to like blocks having functions similar to functions of the image processing apparatus 600 from among the blocks included in the image processing apparatus 900, and the descriptions thereof are omitted herein. The image processing apparatus 900 according to the present exemplary embodiment is different from the image processing apparatus 600 in FIG. 6 in that the image processing apparatus 900 includes an authentication image acquisition unit 907, an authentication unit 908, and a fraud determination unit 909. A hardware configuration of the image processing apparatus 900 is as illustrated in FIG. 1.

The authentication image acquisition unit 907 acquires an authentication image to be used in face authentication. The authentication image acquisition unit 907 displays, for example, an instruction to look at the NW camera 112 on a display screen (the monitor 110) and acquires a face image of a person to be authenticated captured by the NW camera 112. A method for acquiring an authentication image is not limited to a specific method.

The authentication unit 908 performs face authentication using the authentication image acquired by the authentication image acquisition unit 907. The authentication unit 908 checks the authentication image (the face image of the person to be authenticated) against registered data acquired in advance and determines whether the person authenticated is allowed to pass through, for example, a gate. The authentication unit 908 permits the authenticated person to pass through the gate if the face of the person to be authenticated matches the registered data, while prohibiting the person to be authenticated from passing through the gate if the face of the person to be authenticated does not exist in the registered data. Known techniques can be used for face authentication.

The fraud determination unit 909 performs an impersonation determination using the authentication image acquired by the authentication image acquisition unit 907. The fraud determination unit 909 according to the present exemplary embodiment determines whether the authentication image is an image of a living body and determines whether impersonation is performed based on the determination result. If it is determined that impersonation is not performed, the fraud determination unit 909 controls the authentication unit 908 to perform face authentication. If it is determined that impersonation is performed, the fraud determination unit 909 prohibits the person to be authenticated from passing through the gate as an authentication failure regardless of the face authentication result.

If it is determined that impersonation is performed, the fraud determination unit 909 outputs information indicating that the person to be authenticated is committing a fraudulent act to the person information management unit 604. The impersonation determination can be made using a deep learning model that is trained in advance to distinguish between a living body and impersonation. As another method, the fraud determination unit 909 can issue an instruction, such as to look away, to a person to be authenticated and perform an impersonation determination based on whether the person to be authenticated can follow the instruction. A method for impersonation determination is not limited to a specific method.

The fraud determination unit 909 can change a criterion for impersonation determination using an identification result of a fraudulent person by the fraudulent person identification unit 605 and information managed by the person information management unit 604. Specifically, if a person belonging to the same group as a person to be authenticated is committing a quasi-fraudulent act during a face authentication, the criterion can be changed such that the person to be authenticated is more likely to be determined to perform impersonation.

In some embodiments, if a person to be authenticated is committing a quasi-fraudulent act before starting to perform a face authentication, the criterion can be changed such that the person to be authenticated is more likely to be determined to perform impersonation. A method and a condition for changing the criterion for impersonation are not limited to those described above, and various modifications can be used.

Figure 10:
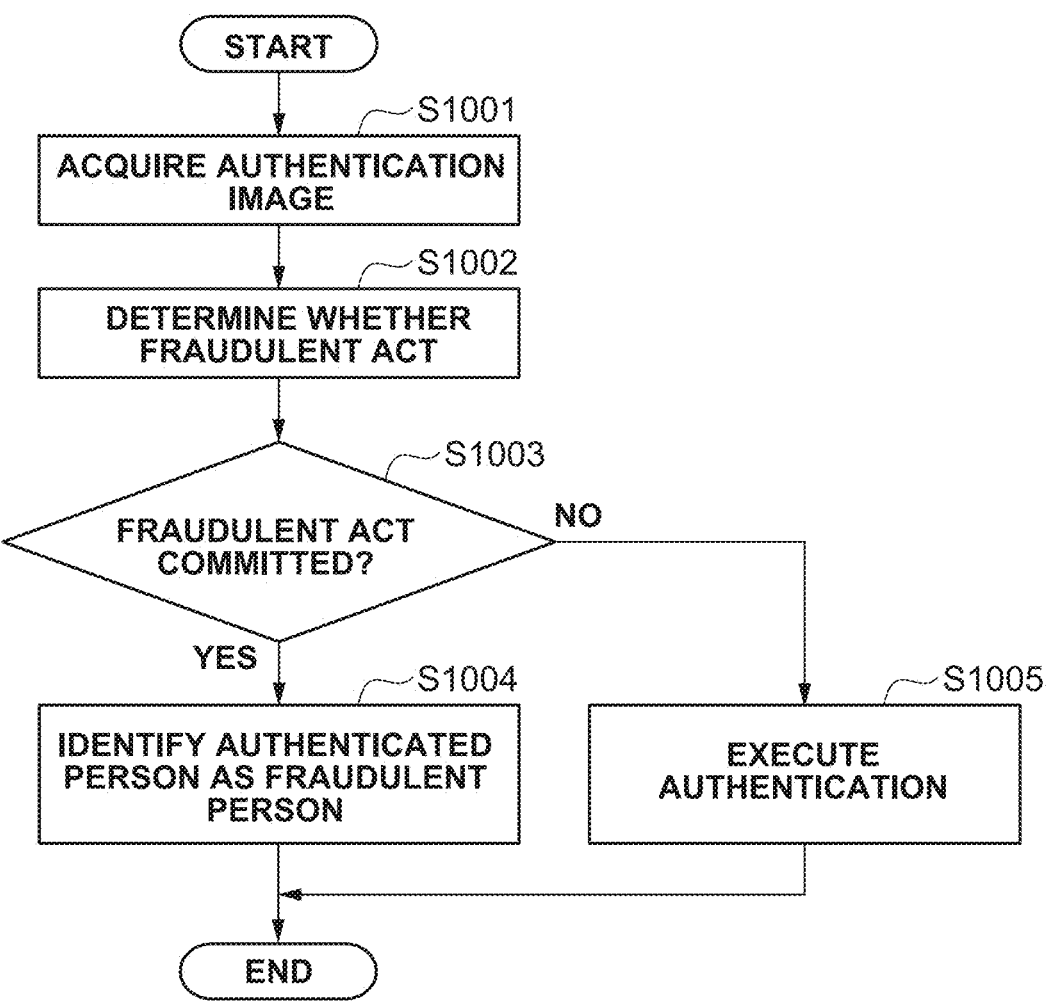
FIG. 10 is a flowchart illustrating processing executed by the image processing apparatus according to the third exemplary embodiment.

An operation of the image processing apparatus 900 according to the present exemplary embodiment will be described with reference to FIG. 10.

In step S1001, the authentication image acquisition unit 907 acquires an authentication image. Then, in step S1002, the fraud determination unit 909 determines whether impersonation is performed based on the authentication image. If it is determined that impersonation is performed (YES in step S1003), the processing proceeds to step S1004. In step S1004, the fraud determination unit 909 identifies the person to be authenticated as a fraudulent person (fraudulent perpetrator) and outputs information about the person authenticated to the person information management unit 604. In this case, the fraud determination unit 909 prohibits the person to be authenticated from passing through the gate.

If it is determined that impersonation is not performed (NO in step S1003), the processing proceeds to step S1005. In step S1005, the authentication unit 908 executes face authentication processing based on the authentication image acquired by the authentication image acquisition unit 907 and the registered data acquired in advance and allows the person to be authenticated to pass through the gate.

As described above, the image processing apparatus 900 according to the present exemplary embodiment detects impersonation as a fraudulent act. Thus, the image processing apparatus 900 can identify a fraudulent person who commits a fraudulent act without using a behavior estimation result. In addition, the image processing apparatus 900 according to the present exemplary embodiment changes the criterion for impersonation detection using information managed by the person information management unit 604 and thus provides an effect of higher accuracy of impersonation detection.

According to the third exemplary embodiment, an example is described in which the fraudulent act is impersonation in a face authentication. However, an authentication executed by the authentication unit 908 is not limited to a face authentication, and any processing for determining whether information acquired from the authenticated person exists in registered data can be used as a face authentication. Examples of authentication other than face authentication include fingerprint authentication and password authentication. In addition, the detection of a fraudulent act is not limited to impersonation detection, and any detection can be made as long as a plurality of persons included in a captured image can be classified into a fraudulent perpetrator and a general person who does not commit the fraudulent act.

A fourth exemplary embodiment will now be described. According to the above-described exemplary embodiments, a method has been described for identifying a fraudulent person based on a combination of behaviors and/or positions of a plurality of persons in an image captured by a monitoring camera (the NW camera 112). According to the fourth exemplary embodiment, a method will be described for outputting an identification result of a fraudulent person. An identification result of a fraudulent person is notified to a user, e.g., a facility manager, so that the user can take an appropriate action corresponding to the result. Specifically, the user can, for example, dispatch a security guard to a location where the fraudulent person is identified, call the police, or restrict a service sought by the fraudulent person.

Figure 11:
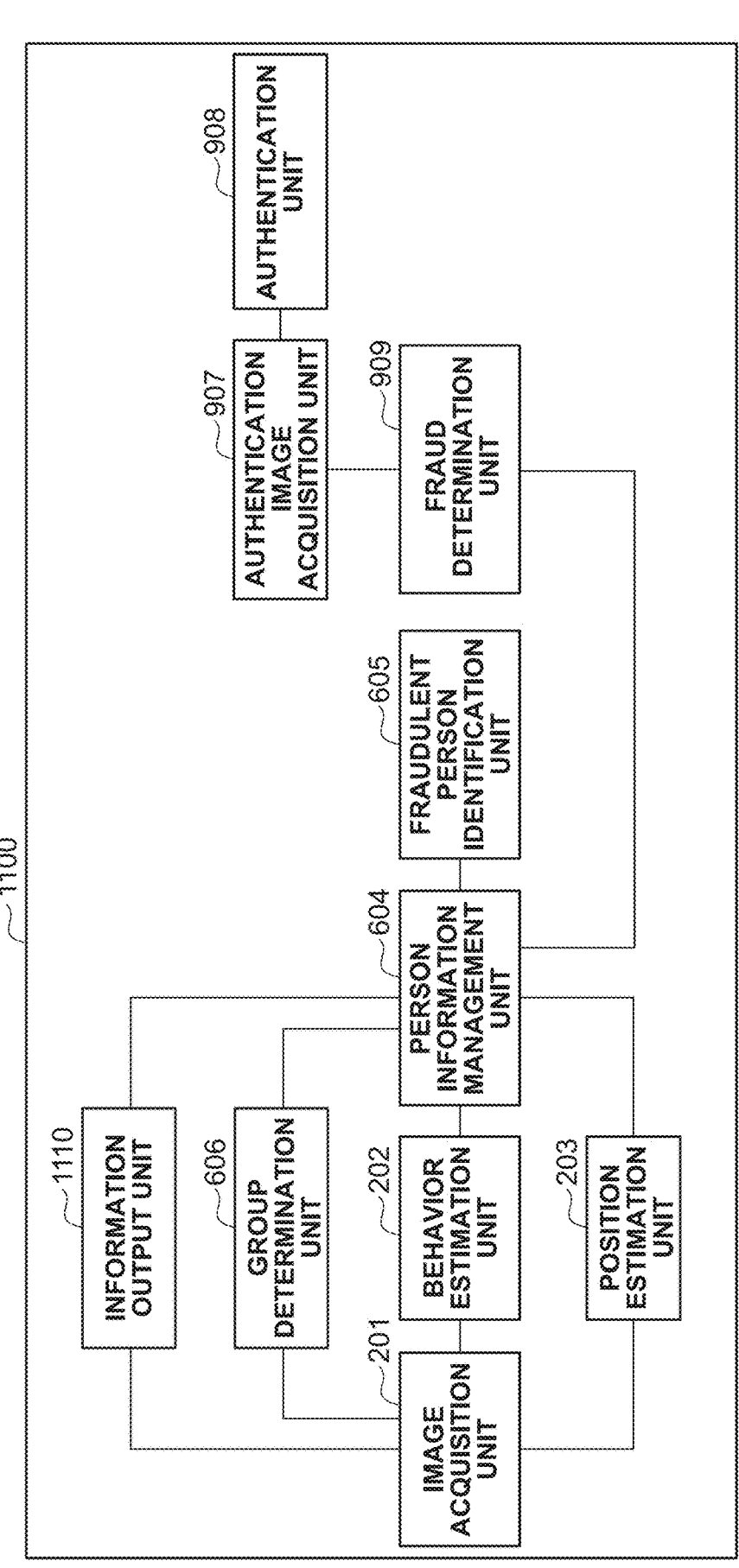
FIG. 11 is a block diagram illustrating functions of an image processing apparatus according to a fourth exemplary embodiment.

The configuration of an image processing apparatus 1100 according to the present exemplary embodiment will now be described with reference to a block diagram in FIG. 11. Like numbers refer to like blocks having functions similar to functions of the image processing apparatus 900 from among the blocks included in the image processing apparatus 1100, and the descriptions thereof are omitted herein. The image processing apparatus 1100 according to the present exemplary embodiment is different from the image processing apparatus 900 in FIG. 9 in that the image processing apparatus 1100 includes an information output unit 1110. A hardware configuration of the image processing apparatus 1100 is as illustrated in FIG. 1.

Figure 12:
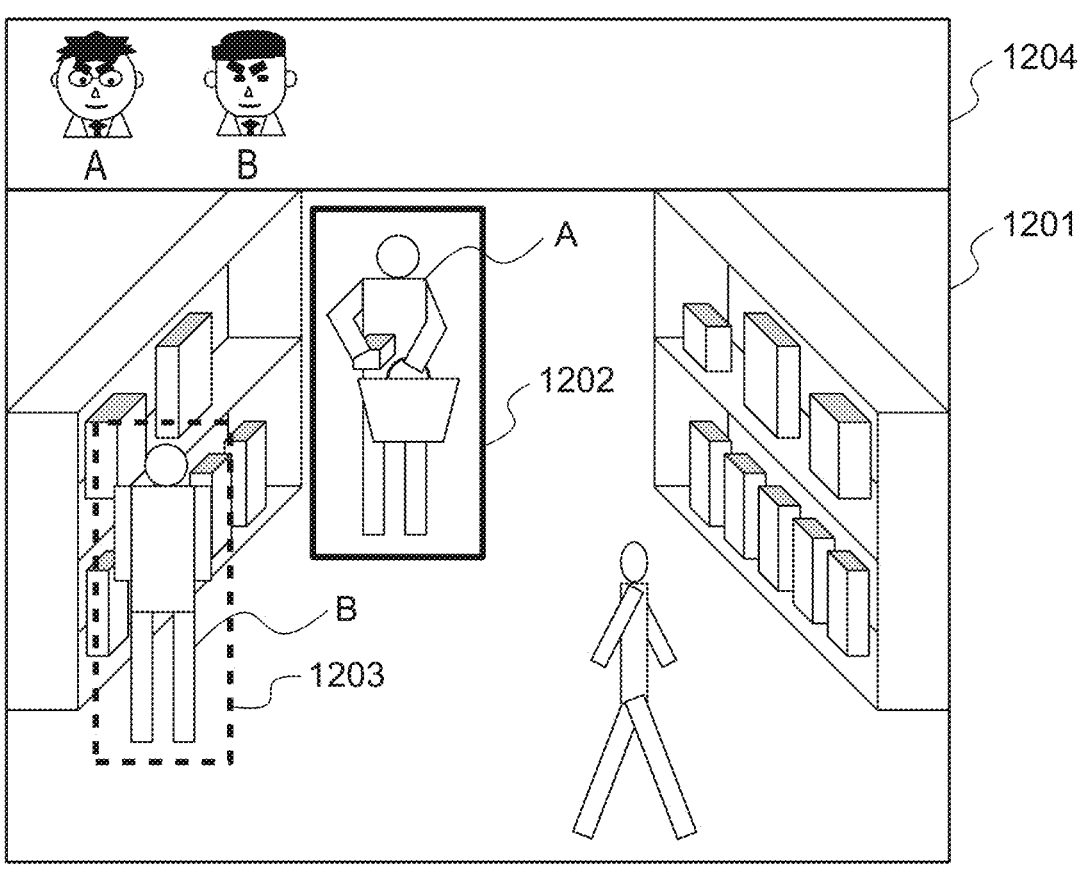
FIG. 12 illustrates an example of a display screen according to the fourth exemplary embodiment.

The information output unit 1110 notifies a user of an identification result of a fraudulent person managed by the person information management unit 604 by displaying the result on a display screen (the monitor 110 in FIG. 1). An example of information displayed by the information output unit 1110 will be described with reference to FIG. 12. As illustrated in FIG. 12, the information output unit 1110 performs a display control to display a monitor image acquired by the image acquisition unit 201 in an area 1201.

The information output unit 1110 highlights a fraudulent person A (a fraudulent perpetrator), who is determined to be shoplifting, which is a fraudulent act, in a solid frame line 1202 added around the fraudulent person A. In addition, the information output unit 1110 highlights a fraudulent person B (a fraudulent collaborator), who is determined to be acting as a lookout, which is a quasi-fraudulent act, in a dashed frame line 1203 added around the fraudulent person B. According to the present exemplary embodiment, the types of frame line (solid line and dashed line) are used to distinguish between the fraudulent perpetrator and the fraudulent collaborator, but the color and the thickness of a frame line can be used for distinction, in addition to or instead of the types of frame line.

The information output unit 1110 according to the present exemplary embodiment causes the monitor 110 to display a face image detected on a monitor image together with an ID (see an area 1204). In addition to a face image and an ID, a behavior estimation result (for example, shoplifting, baggage stealing, or a lookout) can be displayed in the area 1204, or other information acquired from the monitor image or the person information management unit 604 can be displayed.

The information output unit 1110 can associate the ID of a person managed by the person information management unit 604, a behavior that causes the detection of a fraudulent act, and a face image with each other and register them with a blacklist database. Information registered with a blacklist database is not limited to the above-described information, and other information acquired from a monitor image or the person information management unit 604 can be registered. An identification result of a fraudulent person by the information output unit 1110 can be output in a format from among various methods and combinations thereof, such as displaying on the monitor 110, registering with a blacklist database, transmitting an e-mail, or outputting an alarm.

As described above, the image processing apparatus 1100 according to the present exemplary embodiment notifies a user of an identification result of a fraudulent person. This enables a user to take an action corresponding to a result.

Figure 9:
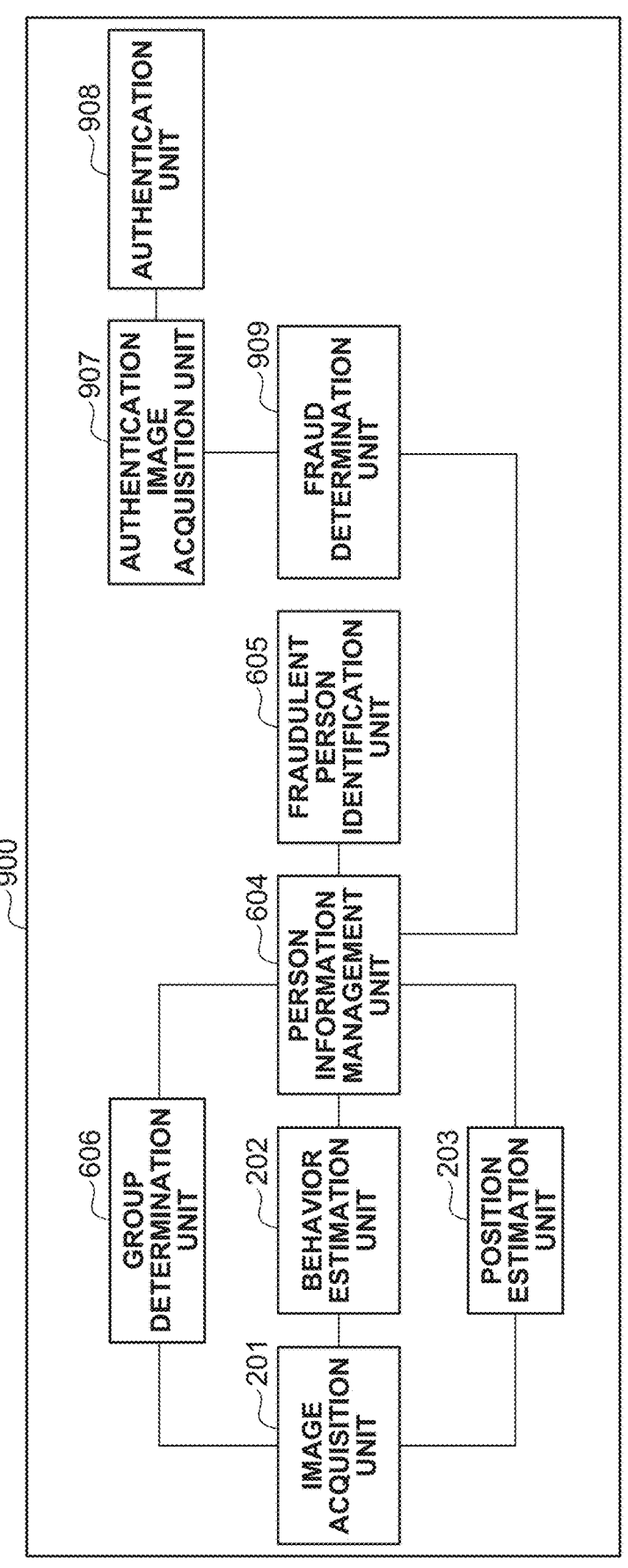
FIG. 9 is a block diagram illustrating functions of an image processing apparatus according to a third exemplary embodiment.

The image processing apparatus 1100 according to the present exemplary embodiment is an image processing apparatus in which the information output unit 1110 is added to the image processing apparatus 900 in FIG. 9, but the present disclosure is not limited to this configuration. For example, the information output unit 1110 can be added to the image processing apparatus 200 illustrated in FIG. 2 or to the image processing apparatus 600 illustrated in FIG. 6. In this way, the exemplary embodiments can be appropriately combined with each other according to an application and a use pattern.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-187261, filed Oct. 31, 2023, which is hereby incorporated by reference herein in its entirety.

What is claimed is:

1. An image processing apparatus comprising:
   at least one memory storing instructions; and
   at least one processor that executes the stored instructions, which cause the at least one processor to:
   acquire a captured image;
   identify at least one fraudulent person involved in a fraudulent act from among a plurality of persons in the captured image based on at least one of a combination of behaviors of the plurality of persons and a combination of positions of the plurality of persons, wherein the at least one fraudulent person comprises two fraudulent persons;

identify a person committing a fraudulent act as one fraudulent person of the two fraudulent persons from among the plurality of persons based on an estimation result of behaviors of the plurality of persons and identify a person aiding and abetting a fraudulent act as another fraudulent person of the two fraudulent persons based on at least one of a combination of behavior and a combination of positions of the person committing the fraudulent act and another person;

acquire an authentication image to be used in authentication processing for a person to be authenticated;

determine whether the person to be authenticated is the person committing the fraudulent act based on the authentication image; and identify the person aiding and abetting the fraudulent act from among the plurality of persons based on a positional relationship between a camera that captures an image of the person to be authenticated and the plurality of persons.

2. The image processing apparatus according to claim 1, wherein the instructions further cause the at least one processor to identify the at least one fraudulent person based on the combination of behaviors of the plurality of persons or the combination of positions of the plurality of persons.

3. The image processing apparatus according to claim 1, wherein the at least one fraudulent person comprises two or more fraudulent persons, and wherein the instructions further cause the at least one processor to identify the two or more fraudulent persons from among the plurality of persons.

4. The image processing apparatus according to claim 1, wherein the at least one fraudulent person comprises two or more fraudulent persons, and wherein the instructions further cause the at least one processor to identify one or more persons committing a fraudulent act and one or more persons aiding and abetting a fraudulent act respectively as the two or more fraudulent persons.

5. The image processing apparatus according to claim 1, wherein the at least one fraudulent person comprises two or more fraudulent persons, and wherein the instructions further cause the at least one processor to:

determine two or more persons who belong to a group from among the plurality of persons based on a tracking processing result of the plurality of persons, and identify the two or more fraudulent persons based on at least one of a combination of behaviors of the two or more persons determined to belong to the group and a combination of positions of the two or more persons determined to belong to the group.

6. The image processing apparatus according to claim 1, wherein the instructions further cause the at least one processor to identify as the person aiding and abetting a fraudulent act a person who performs at least one of watching an area around the person committing a fraudulent act, hiding the person committing the fraudulent act from a camera, hiding the person committing the fraudulent act from a passerby, talking to a person who approaches the person committing the fraudulent act, drawing an attention of a security guard, or blocking a path of a passerby.

7. The image processing apparatus according to claim 1, wherein the instructions further cause the at least one processor to, in a case where a person who performs a specific behavior before or during the authentication processing is identified, change a criterion in the authentication processing so that a result of the authentication processing for the person to be authenticated is more likely to indicate failure.

8. The image processing apparatus according to claim 1, wherein the instructions further cause the at least one processor to perform control to display the captured image and an identification result of the at least one fraudulent person by an identification unit on a display screen.

9. The image processing apparatus according to claim 1, wherein the instructions further cause the at least one processor to generate a blacklist database based on an identification result of a fraudulent person.

10. A method for image processing executed by an image processing apparatus, the method comprising:

acquiring a captured image; and identifying at least one fraudulent person involved in a fraudulent act from among a plurality of persons in the captured image based on at least one of a combination of behaviors of the plurality of persons and a combination of positions of the plurality of persons, wherein the at least one fraudulent person comprises two fraudulent persons;

identifying a person committing a fraudulent act as one fraudulent person of the two fraudulent persons from among the plurality of persons based on an estimation result of behaviors of the plurality of persons and identifying a person aiding and abetting a fraudulent act as another fraudulent person of the two fraudulent persons based on at least one of a combination of behavior and a combination of positions of the person committing the fraudulent act and another person;

acquiring an authentication image to be used in authentication processing for a person to be authenticated;

determining whether the person to be authenticated is the person committing the fraudulent act based on the authentication image; and identifying the person aiding and abetting the fraudulent act from among the plurality of persons based on a positional relationship between a camera that captures an image of the person to be authenticated and the plurality of persons.

11. The method according to claim 10, wherein, a fraudulent person is identified based on the combination of behavior of the plurality of persons or the combination of positions of the plurality of persons.

12. The method according to claim 10, further comprising determining two or more persons who belong to a group from among the plurality of persons based on a tracking processing result of the plurality of persons, wherein the at least one fraudulent person comprises two or more fraudulent persons, and wherein, the two or more fraudulent persons are identified based on at least one of a combination of behaviors of the two or more persons determined to belong to the group and a combination of positions of the two or more persons determined to belong to the same group.

13. The method according to claim 10, wherein, a person who performs at least one of watching an area around the person committing the fraudulent act, hiding the person committing the fraudulent act from a camera, hiding the person committing the fraudulent act from a passerby, talking to a person who approaches the person committing the fraudulent act, drawing an attention of a security guard, or blocking a path of a passerby is identified as the person aiding and abetting the fraudulent act.

14. A non-transitory computer-readable storage medium storing a program for causing a computer to execute a method performed by an image processing apparatus, the method comprising:

acquiring a captured image; and identifying at least one fraudulent person involved in a fraudulent act from among a plurality of persons in the captured image based on at least one of a combination of behaviors of the plurality of persons and a combination of positions of the plurality of persons, wherein the at least one fraudulent person comprises two fraudulent persons;

identifying a person committing a fraudulent act as one fraudulent person of the two fraudulent persons from among the plurality of persons based on an estimation result of behaviors of the plurality of persons and identifying a person aiding and abetting a fraudulent act as another fraudulent person of the two fraudulent persons based on at least one of a combination of behavior and a combination of positions of the person committing the fraudulent act and another person;

acquiring an authentication image to be used in authentication processing for a person to be authenticated;

determining whether the person to be authenticated is the person committing the fraudulent act based on the authentication image; and identifying the person aiding and abetting the fraudulent act from among the plurality of persons based on a positional relationship between a camera that captures an image of the person to be authenticated and the plurality of persons.

\* \* \* \* \*